(12) United States Patent
Mästele et al.

(10) Patent No.: US 8,070,049 B2
(45) Date of Patent: Dec. 6, 2011

(54) DEVICE AND METHOD FOR WAVE SOLDERING

(75) Inventors: Johann Mästele, Wain (DE); Ernst Wandke, Geretsried (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 11/805,394

(22) Filed: May 22, 2007

(65) Prior Publication Data

US 2008/0277457 A1 Nov. 13, 2008

(30) Foreign Application Priority Data

May 23, 2006 (DE) .......................... 10 2006 024 192
Jul. 27, 2006 (EP) ....................................... 06015706

(51) Int. Cl.
*B23K 31/02* (2006.01)
(52) U.S. Cl. .............. 228/219; 228/37; 228/42; 228/260
(58) Field of Classification Search .................... 228/37, 228/219
See application file for complete search history.

(56) References Cited

U.S. PATENT DOCUMENTS

| | | | |
|---|---|---|---|
| 5,044,542 A * | 9/1991 | Deambrosio | 228/37 |
| 5,121,874 A * | 6/1992 | Deambrosio et al. | 228/219 |
| 5,121,875 A | 6/1992 | Hergerty et al. | |
| 5,176,307 A * | 1/1993 | Hagerty et al. | 228/37 |
| 5,203,489 A * | 4/1993 | Gileta et al. | 228/219 |
| 5,320,274 A * | 6/1994 | Precious et al. | 228/37 |
| 5,358,167 A * | 10/1994 | Tachibana et al. | 228/42 |
| 5,409,159 A | 4/1995 | Connors et al. | |
| 5,411,200 A * | 5/1995 | Connors et al. | 228/219 |
| 5,509,598 A * | 4/1996 | Nayar et al. | 228/180.1 |
| 5,769,305 A * | 6/1998 | Takeda et al. | 228/37 |
| 6,116,491 A * | 9/2000 | Katoh | 228/42 |
| 6,305,596 B1 * | 10/2001 | Lin et al. | 228/125 |
| 6,352,190 B1 * | 3/2002 | Lucht et al. | 228/37 |
| 6,378,753 B1 * | 4/2002 | Schellen et al. | 228/37 |
| 2004/0060960 A1 * | 4/2004 | Becker et al. | 228/37 |

FOREIGN PATENT DOCUMENTS

| | | |
|---|---|---|
| DE | 4421996 | 1/1996 |
| DE | 195 41 445 B4 | 2/2005 |
| EP | 0761361 | 3/1997 |
| WO | WO 92/10323 A | 6/1992 |

* cited by examiner

*Primary Examiner* — Kiley Stoner
(74) *Attorney, Agent, or Firm* — Joshua L. Cohen

(57) ABSTRACT

The instant invention relates to a device for wave soldering workpieces, encompassing means for moving the workpiece, which is to be soldered, along a specific path across at least one solder wave generated above a solder reservoir, with a protective and/or active gas atmosphere of a first composition being located above the solder reservoir so as to exclude oxygen and with means for introducing the protective and/or active gas as well as an enclosure being provided, with the enclosure being configured in such a manner that it encloses at least the essential parts of a solder zone.

26 Claims, 1 Drawing Sheet

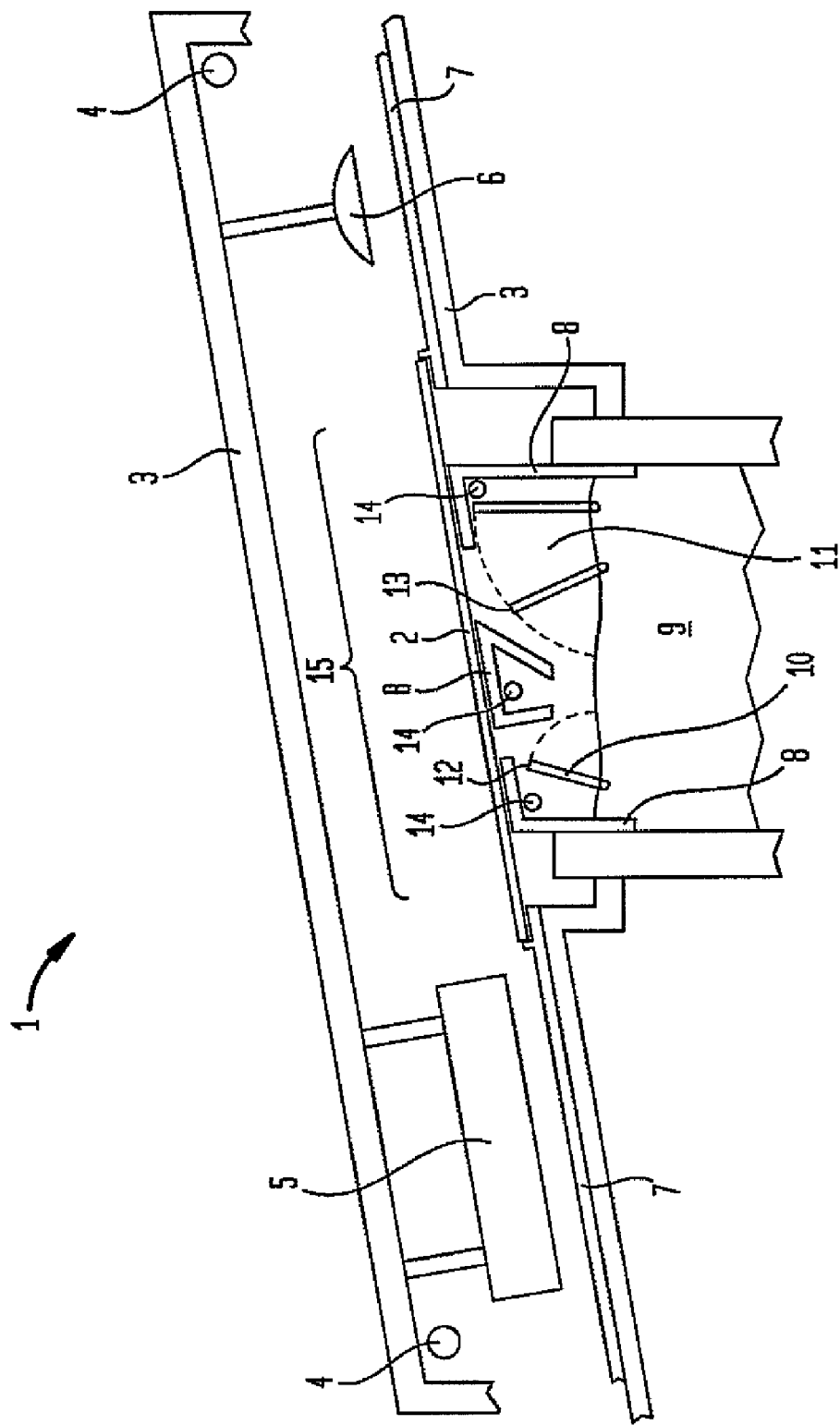

DEVICE AND METHOD FOR WAVE SOLDERING

CROSS-REFERENCE TO RELATED APPLICATION

This application claims priority under 35 U.S.C. §119 to German Patent Application No. DE102006024192.4, filed in the German Patent and Trade Mark Office, the disclosure of which is incorporated by reference herein in its entirety.

FIELD OF THE INVENTION

1. Field of the Disclosure

The present invention relates to a device for wave soldering workpieces.

2. Description of the Related Art

The known arrangements for wave soldering under a protective gas atmosphere can be divided into two categories. There are 1) the so-called tunneling machines and 2) the atmosphere soldering machines, which are often partially provided with a cover in the solder region.

It is generally known that the soldering under a protective gas atmosphere has many advantages. Only a few of them will be mentioned here. For example, the protective gas atmosphere enables a considerable reduction of the required flux material to some extent. The protective gas atmosphere, which is generally inert and thus results in a wide-range exclusion of oxygen from the atmosphere surrounding the soldering process, prevents oxidative processes.

As is generally known, the wave soldering under a protective gas atmosphere in a tunneling machine generates a very good solder result, but generally requires large quantities of protective gas leading to comparatively high operating costs. The pre-heating of the workpieces, the actual soldering process and a subsequent cooling that occur under a protective gas atmosphere.

The soldering under protective gas in an atmosphere soldering machine comprising a partial cover over the actual solder region enables only a part of the advantages, in comparison with a tunneling machine, with it being possible to considerably reduce the operating costs by means of a clearly reduced inert gas consumption. Such a machine is described, for example, in DE 195 41 445 B4.

SUMMARY OF THE INVENTION

The instant invention relates to a device for wave soldering workpieces, encompassing means for moving the workpiece, which is to be soldered, along a specific path across at least one solder wave generated above a solder reservoir, with a protective and/or active gas atmosphere of a first composition being located above the solder reservoir so as to exclude oxygen and with means for introducing the protective and/or active gas as well as an enclosure being provided, with the enclosure being configured in such a manner that it encloses at least the essential parts of a solder zone.

The instant invention also relates to a method for wave soldering workpieces, with the workpiece, which is to be soldered, being moved along a specific path across at least one solder wave generated above a solder reservoir, with a protective and/or active gas atmosphere of a first composition being generated above the solder reservoir so as to largely exclude oxygen and with the introduced protective and/or active gas as well as at least the solder reservoir and the solder wave as essential parts of the solder zone being at least partially shielded by an enclosure in such a manner and the path of the workpiece being guided in such a manner that at least a part of the workpiece comes into contact with at least a part of the solder wave.

BRIEF DESCRIPTION OF THE DRAWING

The present invention will become more apparent by describing in detail exemplary embodiments thereof with reference to the attached drawings in which the FIGURE is a cross-sectional view illustrating the wave soldering device thereof according to embodiments of the present invention.

DETAILED DESCRIPTION OF PREFERRED EMBODIMENTS

The instant invention provides an improved device for wave soldering, which is optimized in view of the consumption of protective gas and the possibilities for affecting the workpiece by means of the protective gas. Furthermore, this invention provides a corresponding improved method.

In addition to the solder zone, provision is made for yet another zone, where the workpiece is located at least for a short distance prior to or after the solder treatment, with provision being made for a housing, which surrounds the enclosure and at least a further zone and provision being made for introducing a protective and/or active gas atmosphere of a second composition into the housing, with the enclosure surrounding the protective and/or active gas atmosphere of the first composition and the protective and/or active gas atmosphere of the second composition surrounding the enclosure as well as the housing surrounding the enclosure and the protective and/or active gas atmosphere of the second composition.

The solder zone in the device comprises its own protective gas atmosphere, with the protective gas atmosphere of the solder zone (first protective gas atmosphere) advantageously not directly bordering on the ambient air, but only coming into contact with the second protective gas atmosphere, e.g. in the region of the openings for the means for moving the workpiece. The further zone can serve the purpose of pre-heating the workpiece, for example.

Furthermore, yet another zone can serve the purpose of cooling the workpiece after the solder process. However, a separate cooling region is often also connected downstream from the device according to the invention. In this case, the device generally has only one further zone. The possibility of using protective and/or active gas atmospheres comprising different compositions in the individual zones has proven itself to be very advantageous. The use of a certain composition can be optimized in view of the utilization of the protective and/or active gas effect on the workpiece, e.g., also in the pre-heating region in view of the desired solder quality or in view of other aspects. The pre-heating of the workpiece or the activation of the flux material may be carried out with a protective gas atmosphere, which is composed differently than the actual solder process.

For reasons of simplicity and brevity, the protective and/or active gas atmosphere will hereinafter be referred to only as protective gas atmosphere. However, it is expressly pointed out here that the term always also includes active gas, or may also represent an active gas alone.

An embodiment of the device according to the invention is that it enables a double use of the protective gas. For example, an inert gas, e.g. nitrogen, which is discharged from the solder zone, is used again in the further zone, e.g. in response to the pre-heating and/or the upstream inerting of the workpiece.

Without the housing according to the invention, this gas would have escaped into the surroundings without being able to be used further.

Another embodiment of the instant invention provides for the further zone to thus configured as a pre-heating zone for the workpiece and is connected upstream of the solder zone.

Another embodiment of the invention provides that the further zone is configured as a cooling zone for the workpiece and is connected downstream from the solder zone.

Another embodiment of the invention provides that one or a plurality of the further zones each have their own enclosure, which is provided for enclosing and separating the respective protective and/or active gas atmosphere of the respective zone. Each zone can thus be equipped with its own optimal protective gas atmosphere.

In another embodiment of this invention, the enclosure is installed below the path of the workpiece, which results in a minimization of the volume which is to be enclosed and thus also in a minimization of the protective gas requirement. Furthermore, the accessibility of the solder zone is also improved herewith and the maintenance effort is thus reduced.

In another embodiment of this invention, provision is made for means for controlling and/or regulating the composition of the protective gas atmospheres. This leads to very advantageously separately adjustable and/or regulatable protective gas atmospheres in the regions of the first and second protective gas composition.

In another embodiment of this invention, provision is made for a device for controlling and/or regulating the composition of the individual protective gas atmosphere, with each device being individually adjustable and/or regulatable.

In another embodiment of this invention, provision is made for a higher-ranking control and/or regulating device for adjusting and/or regulating the compositions of the protective gas atmospheres, which coordinates the individual compositions according to a predetermined relationship to one another.

In another embodiment of this invention, the means for introducing a first and/or second protective gas atmosphere are configured as gas diffusers. For example, the gas outlets of the gas diffusers for the first protective gas atmosphere are directed towards the walls of the enclosure from the inside, whereby an almost homogenous distribution of the protective gas is achieved within the enclosure. Advantageously, the gas diffusers for introducing the protective gas atmosphere of the second composition are directed to the walls of the housing from the inside.

In yet another embodiment, the gas diffusers are configured as a perforated tube. Advantageously, the means for introducing the protective gas atmosphere can, for example, also be configured as injectors or lances. In particular, the means for introducing the protective gas atmosphere of the second composition can advantageously be configured as rotatable lances, with the help of which it is made possible to specifically influence the flow direction of the second protective gas atmosphere. According to an alternative embodiment, however, the means for introducing a protective gas atmosphere of a second composition can also be realized simply by the influx of the gas excess escaping from the first protective gas atmosphere. The protective gas atmosphere of the second composition then forms a type of buffer zone for the surroundings, the composition of which differs from the surroundings and from the composition of the first protective gas atmosphere.

According to a further embodiment of the instant invention, the enclosure is embodied in such a manner that the developing flow of the protective gas atmosphere of the first composition runs substantially parallel to the surface of the solder wave.

The workpiece, in addition to the solder zone surrounded by the enclosure, further passes through at least yet another zone, with the enclosure and at least one further zone being shielded from the surroundings by a housing and a protective and/or active gas atmosphere of a second composition being introduced into the housing, whereby the workpiece successively passes protective and/or active gas atmospheres of different compositions, with the protective and/or active gas atmosphere of the first composition being surrounded by the protective and/or active gas atmosphere of the second composition.

In an embodiment of this invention, the method proceeds such that the workpiece, prior to the solder process, passes through a further zone, in which the workpiece is pre-heated.

According to another embodiment of the invention, the method proceeds such that the workpiece, after the solder process, passes through a further zone, in which the workpiece is cooled.

According to another embodiment of the invention, the method proceeds such that one or a plurality of the further zones and the protective and/or active gas atmospheres thereof are each shielded by means of their own enclosure.

According to another embodiment of this invention, the flow of the protective gas atmosphere of the first composition developing in response to the introduction is guided essentially parallel to the surface of the solder wave.

In another embodiment of this invention, inert gases or inert gas mixtures, in particular nitrogen or nitrogen-containing inert gas mixtures, are used as protective and/or active gas atmospheres.

According to an another embodiment of the invention, a protective gas atmosphere of the first composition is used, which includes toxic and/or combustible gases, in particular hydrogen. In particular with the use of hydrogen, it is advantageous to use two protective gas atmospheres of different compositions. For example, the hydrogen content in the first protective gas atmosphere can be chosen to be higher, without exceeding in the remaining process zone, e.g., in the pre-heating region, the critical value for the nitrogen concentration, which is permissible there. For nitrogen, this value is generally less than or equal to 5% of nitrogen in the protective gas atmosphere for the protective gas atmosphere of the second composition.

According to another embodiment, a protective gas atmosphere of the first composition is used, which is doped with liquid and/or gaseous flux material. The separation of the protective gas atmospheres according to the invention leads to a considerably reduced consumption of flux material.

According to a further advantageous embodiment of the instant invention, a protective gas atmosphere of the second composition is used, which includes a smaller portion of inert gas than the protective gas atmosphere of the first composition.

In yet another embodiment, the compositions of the protective gas atmospheres are controlled and/or regulated. In some cases, the composition of each individual protective gas atmosphere is adjusted and/or regulated individually. In another case, the compositions of the protective gas atmospheres are adjusted and/or regulated by means of a higher-ranking control and/or regulating device, which coordinates the individual compositions according to a predetermined relationship to one another.

In summary, several of the manifold advantages of the instant invention will be described below:

The invention enables an improved utilization of the inert gas, an improved stabilization of the composition of the protective gas atmosphere, in particular in the solder zone as well as an optimization of the compositions of the protective gas atmospheres in the individual process zones, for example in the pre-heating region, in the solder region and/or in a cooling region.

Furthermore, the instant invention enables an advantageous optimization of the inert gas consumption as a function of the required solder quality.

Furthermore, an advantageous possibility for the use of combustible and/or toxic gases or gas mixtures, in particular in the solder region, was found with the invention. Forming gas, pure hydrogen and/or gaseous flux material can be used without any problems.

Advantageously, the pre-heating of the workpiece and/or the activation of flux material can occur in a protective gas atmosphere, which is composed differently than the actual solder process.

The instant invention also enables the doping of the protective gas atmosphere of the first composition with liquid and/or gaseous flux material without noteworthy quantities escaping from the entire arrangement. Advantageously, the protective gas atmosphere of the second composition thereby has a certain buffering effect.

The possibility of adjusting a desired value for the heat transfer in the individual regions of the process zone via the portion of certain gases in the composition of the individual protective gas atmospheres is also particularly advantageous. For this purpose, the portion of helium and/or hydrogen in the protective gas composition is used, for example.

Due to the embodiment of the instant invention, the protective gas atmosphere of the first composition, that is, the protective gas atmosphere in the solder region has become more independent from influences from the surroundings of the solder arrangement, because the protective gas atmosphere of the second composition buffers such influences.

The invention advantageously achieves an optimal inert gas utilization and an optimal inert gas regime. The use of inert gas can be planned according to the desired solder quality. For example, a solder quality is made possible with a lower nitrogen use, which is higher than with a common tunneling machine for wave soldering.

The flow direction of the individual protective gas atmospheres can be influenced by a simple arrangement of the gas diffusers. The situation at the openings of the housing for inserting and removing the workpiece is simplified; to some extent, operation can occur without sluices and with a decreased suction output for escaping protective gas. An advantageous decrease can also be expected for the maintenance effort.

The invention as well as further embodiments of the invention will be described in detail below by means of the exemplary embodiments illustrated in the FIGURE.

The FIGURE shows a device for wave soldering with preheating and cooling zone according to the invention.

In detail, the FIGURE shows a device 1 for wave soldering of a workpiece 2. The device 1 encompasses a housing 3 with means 4 for introducing a protective gas atmosphere of a second composition. Furthermore, the FIGURE shows a device 5 for pre-heating the workpiece 2, a device 6 for cooling the workpiece 2 after the solder process and a solder device 15 between the devices 5 and 6, in the solder wave 10, 11 and the solder reservoir 9 being surrounded by an enclosure 8. With the help of means 7, the workpiece 2 is transported through the housing 3, which surrounds all of the above-mentioned components, for the purpose of moving the workpiece 2.

In this example, the solder wave peaks 12 and 13 necessary for the solder process remain recessed by the enclosure 8 and the path along which the workpiece 2 is transported via the solder waves 10 and 11 generated above the solder reservoir 9, is chosen in such a manner that at least a part of the workpiece 2 comes into contact with the solder wave peaks 12, 13.

Furthermore, the enclosure 8 surrounds means 14 for introducing a protective gas atmosphere of a first composition. Two regions thus result, namely within the enclosure 8 and on the inside of the housing 3, which each include a protective gas atmosphere, the compositions of which (first and second) are generally chosen to be different from one another so that different protective gas atmospheres are present in the different process zones and act upon the workpiece and the processes, e.g. the pre-heating (see reference numeral 5), the actual solder process (see reference numerals 8 to 15) and the cooling process (see reference numeral 6).

With the recess in the enclosure 8 mentioned in this example, the above-mentioned buffering function of the protective gas atmosphere of the second composition becomes clear once again. A certain portion of the protective gas atmosphere of the first composition escapes through the recess. The housing 3 surrounding the enclosure 8 avoids an escape into the surroundings and a mixture with the ambient air, because the portion only comes in contact with the protective gas atmosphere of the second composition and will mix therewith, which enables another use of this portion of protective gas. In the case of protective gas compositions, which react with air, the avoidance of the contact with the ambient air can have a crucial impact in view of the safe usage of the protective gas compositions as protective gas of the first composition.

The described advantageous embodiments by means of control and/or regulating devices are not illustrated in this exemplary embodiment. However, it is once again emphasized herein that they represent a very valuable addition for the practice and considerably facilitate a specific achievement of certain protective gas atmospheres.

What is claimed is:

1. A device for wave soldering workpieces, comprising a solder zone; means for moving a workpiece which is to be soldered along a path through the solder zone; a solder reservoir disposed in the solder zone including at least one solder wave generated from the solder reservoir; a first gas atmosphere having a first composition provided to the solder reservoir to largely exclude oxygen from the at least one solder wave; first means for introducing the first gas atmosphere to the solder reservoir; an enclosure for the solder reservoir and the first gas atmosphere disposed below the path of the workpiece and having at least one recess therein through which a solder wave peak is provided, the enclosure enclosing the first gas atmosphere and at least a portion of the solder zone such that the solder wave peak contacts the workpiece through the at least one recess of the enclosure; at least one further zone in addition to the solder zone in which the workpiece is located before or after the wave soldering; a housing surrounding the enclosure and the at least one further zone; and second means for introducing a second gas atmosphere having a second composition different from the first composition into the housing for providing a buffer between any of the first gas atmosphere having escaped through the at least one recess and ambient atmosphere in the housing; wherein the second gas atmosphere surrounds the enclosure, and the housing surrounds the enclosure and the second gas atmosphere.

2. The device according to claim 1, wherein the first and second gas atmospheres are selected from a group consisting of a protective gas, an active gas, and a mixture of protective and active gases.

3. The device according to claim 1, wherein the at least one further zone is configured as a pre-heating zone for the workpiece and is connected upstream of the solder zone.

4. The device according to claim 1, wherein the at least one further zone is configured as a cooling zone for the workpiece and is connected downstream from the solder zone.

5. The device according to claim 1, wherein one or a plurality of the further zones each comprise one of the enclosure for enclosing and separating a respective protective and/or active gas atmosphere of the respective further zone.

6. The device according to claim 1, comprising a controlling means for controlling the first and second compositions.

7. The device according to claim 1, comprising a regulating means for regulating the first and second compositions.

8. The device according to claim 1, comprising another device for controlling and/or regulating the first and second compositions, said another device being adjustable and/or regulatable.

9. The device according to claim 1, comprising a control and/or regulating device for adjusting and/or regulating the first and second compositions according to a predetermined relationship of said compositions.

10. The device according to claim 1, wherein the first and second means for introducing the gas atmospheres comprise gas diffusers.

11. The device according to claim 10, wherein the gas diffusers are each configured as a perforated tube.

12. The device according to claim 1, wherein the enclosure is configured such that a developing flow of the first gas atmosphere runs essentially parallel to a surface of the solder wave.

13. A method for wave soldering workpieces, comprising moving a workpiece along a path through a solder zone having at least one solder wave generated from a solder reservoir; generating a first gas atmosphere having a first composition for excluding oxygen at the at least one solder wave; enclosing the first gas atmosphere, the solder reservoir and the solder wave of the solder zone with an enclosure disposed below the path of the workpiece; recessing the solder wave in the enclosure and through which the solder wave will peak; guiding the workpiece along the path above the enclosure such that at least a part of the workpiece contacts the solder wave peak at the solder zone; passing the workpiece through at least a further zone in addition to the solder zone; shielding the enclosure and at least the further zone with a housing; and introducing a second gas atmosphere having a second composition different from the first composition into space between the housing and the enclosure for providing a buffer between any of the first gas atmosphere that escapes through the at least one recess and ambient atmosphere in the housing.

14. The method according to claim 13, wherein the first and second gas atmospheres are selected from a group consisting of a protective gas, an active gas, and a mixture of protective and active gases.

15. The method according to claim 13, further comprising pre-heating the workpiece in the further zone prior to the workpiece contacting the solder wave peak.

16. The method according to claim 13, further comprising cooling the workpiece in the further zone after the workpiece contacts the solder wave peak.

17. The method according to claim 13, further comprising shielding each one or a plurality of the further zones and corresponding gas atmospheres thereof with their own enclosure.

18. The method according to claim 13, further comprising guiding a flow of the first gas atmosphere essentially parallel to a surface of the solder wave.

19. The method according to claim 13, wherein the first and second gas atmospheres comprise gases selected from inert gases and inert gas mixtures.

20. The method according to claim 19, wherein the inert gases and the inert gas mixtures are selected from nitrogen, and nitrogen-containing inert gas mixtures.

21. The method according to claim 13, wherein the first composition comprises gas selected from toxic, and combustible gases.

22. The method according to claim 13, wherein the first composition is doped with a substance selected from liquid, and gaseous flux material.

23. The method according to claim 19, wherein the second composition comprises a lower portion of inert gas than is in the first composition.

24. The method according to claim 13, further comprising controlling the first and second compositions.

25. The method according to claim 13, further comprising regulating each of the first and second gas atmospheres individually.

26. The method according to claim 13, further comprising regulating the first and second compositions by means of a regulating device.

* * * * *